(12) United States Patent
Nakagawa

(10) Patent No.: US 6,622,811 B2  
(45) Date of Patent: Sep. 23, 2003

(54) FUEL TANK MOUNTING STRUCTURE FOR SCOOTER

(75) Inventor: Mitsuo Nakagawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 11 days.

(21) Appl. No.: 09/820,986

(22) Filed: Mar. 30, 2001

(65) Prior Publication Data

US 2001/0028168 A1 Oct. 11, 2001

(30) Foreign Application Priority Data

Mar. 30, 2000 (JP) ........................ 2000-095510

(51) Int. Cl.⁷ ............................ B62J 35/00; B62K 11/02
(52) U.S. Cl. ......................... 180/219; 280/835
(58) Field of Search ........................... 180/219, 225, 180/69.1, 69.4; 280/830, 831, 832–835

(56) References Cited

U.S. PATENT DOCUMENTS

| | | | |
|---|---|---|---|
| 4,340,125 A | * | 7/1982 | Watanabe et al. ........... 180/225 |
| 4,930,811 A | * | 6/1990 | Tsukada et al. ............. 280/834 |
| 5,433,286 A | * | 7/1995 | Kumamaru et al. ........ 180/219 |
| 6,402,199 B1 | * | 6/2002 | Wojnowski ................. 280/838 |

FOREIGN PATENT DOCUMENTS

| | | | |
|---|---|---|---|
| GB | 19485 | * | 8/1907 |
| GB | 2210340 | * | 6/1989 |
| JP | 2-193785 | * | 7/1990 |
| JP | 3-21578 | * | 1/1991 |

* cited by examiner

Primary Examiner—Anne Marie Boehler  
(74) Attorney, Agent, or Firm—Birch, Stewart, Kolasch & Birch, LLP (57) ABSTRACT

A fuel tank mounting structure for a scooter having a front frame extended downward from a head pipe, a pair of footboard support frames extended backward from the front frame, a footboard attached to the pair of footboard support frames, and a fuel tank disposed under the footboard. The fuel tank mounting structure includes fuel tank shelves extended from lower parts of the footboard support frames toward the center of the body of the scooter, wherein the fuel tank is seated on cushions placed on the fuel tank shelves, and is held in place by the footboard.

17 Claims, 6 Drawing Sheets

FUEL TANK MOUNTING STRUCTURE FOR SCOOTER

FIELD OF THE INVENTION

The present invention relates to a fuel tank mounting structure for a scooter, capable of increasing freedom of designing a fuel tank and of facilitating mounting a fuel tank on the body of the scooter.

BACKGROUND ART

Generally, the fuel tank of a scooter is disposed under a footboard on which driver's feet may rest. A fuel tank mounting structure will be described.

Figure 6:
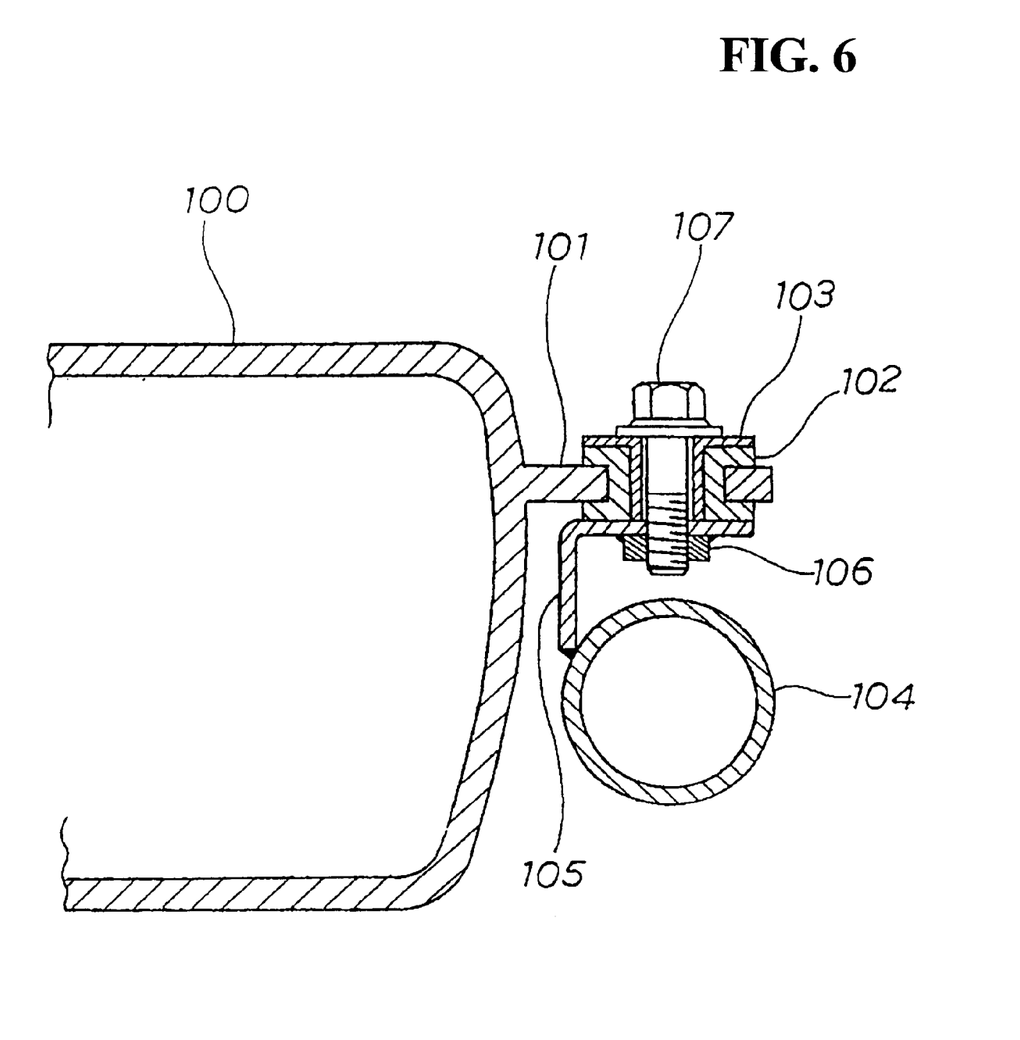
FIG. 6 is a sectional view of a conventional fuel tank mounting structure.

Referring to FIG. 6 showing a conventional fuel tank mounting structure in a sectional view, a fuel tank 100 is integrally provided with a flange 101, a plurality of sets each of a cushion rubber member 102 and a collar 103 are incorporated into the flange 101. Stays 105 are attached to right and left footboard support frames 104 (only one of the floorboard support frames is shown) included in a body frame, nuts are welded to the stays 105, and bolts 107 are passed through the collar 103 and screwed in the nuts 106 to fasten the fuel tank 100 to the footboard support frames 104.

When forming the fuel tank 100, for example, by blow-molding a resin parison, a blow mold must be a split mold that can be split along a parting line corresponding to the flange 101 to form the flange 101. Consequently, the fuel tank 100 must be formed by a limited molding method and the degree of freedom of designing the shape of the fuel tank 100 is reduced.

Since the plurality of bolts 107 is necessary for fastening the fuel tank 100 to the stays, an assembling line for assembling scooters for mass production needs many man-hours for fastening many fuel tanks 100 to the stays with he bolts 107.

Accordingly, it is an object of the present invention to provide a fuel tank mounting structure for a scooter, capable of increasing freedom of designing a fuel tank and of facilitating mounting a fuel tank on the body of the scooter.

SUMMARY OF THE INVENTION

To achieve the object, according to one aspect of the invention, a fuel tank mounting structure for a scooter has a front frame extended downward from a head pipe, a pair of footboard support frames extended backward from the front frame, a footboard attached to the pair of footboard support frames, and a fuel tank disposed under the footboard, the fuel tank mounting structure comprises fuel tank shelves extended from lower parts of the footboard support frames toward the center of the body of the scooter; wherein the fuel tank is seated on cushions placed on the fuel tank shelves, and is held in place by the footboard.

Since the fuel tank is mounted on the cushions placed on the fuel tank support brackets, and is held in place by the floor board, the degree of freedom of designing the fuel tank is greater than that of designing the conventional fuel tank provided with the flange which is fastened to the footboard support frames with screws, the fuel tank does not need any flange, and any fastening step for fastening the fuel tank to the body of the scooter with screws is not necessary.

The fuel tank mounting structure for a scooter according to another aspect of the invention has the fuel tank shelves extended from lower parts of the footboard support frames toward the center of the body, the fuel tank is seated on the cushion sheets placed on the fuel tank shelves, and the fuel tank is held in place by the footboard. Therefore, the degree of freedom of design of the fuel tank is greater than that of the conventional fuel tank provided with a flange to be fastened to the footboard support frames with screws, the fuel tank does not need any flange, and the procedure for mounting the fuel tank on the body frame does not need any fastening step using screws.

Thus, the fuel tank can be manufactured at a low cost and can be easily mounted on the footboard support frames.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will be described hereinafter with reference to the accompanying drawings. The drawings are supposed to be viewed with the reference characters in an erect position.

Figure 1:
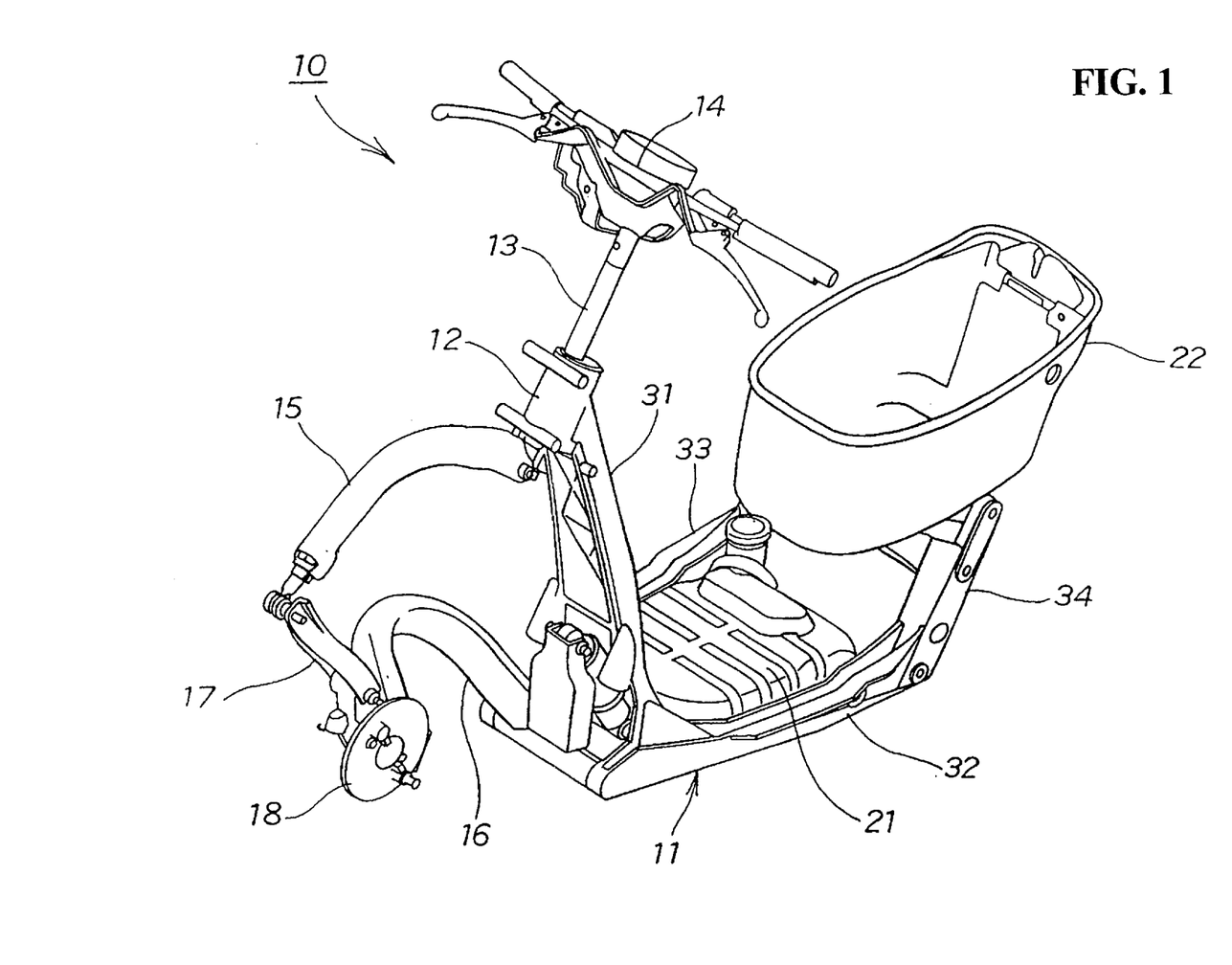
FIG. 1 is a perspective view of an essential part of a scooter employing a fuel tank mounting structure in a preferred embodiment according to the present invention.

FIG. 1 is a perspective view of an essential part of a scooter employing a fuel tank mounting structure in a preferred embodiment according to the present invention, in which body covers, wheels and a power unit are omitted to facilitate understanding the description of the invention.

A scooter 10 has a body frame 11, a head pipe 12 joined to the front end of the body frame 11, a handle post 13 supported for turning on the head pipe 12, a handlebar 14 attached to an upper part of the handle post 13, an upper arm 15 pivotally joined for turning in a vertical plane to a lower end part of the handle post 13, a lower arm 16 pivotally joined for turning in a vertical plane to a lower front part of the body frame 11, a hub 18 supported for rotation and turning in a horizontal plane to a front end part of the lower arm 16, a sub-arm 17 joined to the front end of the upper arm 15 and connected to the hub 18 to steer the hub 18, a fuel tank 21 disposed in a middle part of the body frame 11, and a carrier box 22 attached to a rear part of the body frame 11.

The body frame 11 has a down frame 31, i.e., a front frame, extended backward from the head pipe 12, a right side member 33 and a left side member 32 (footboard support frames) extended backward along the right and the left side of the body frame 11, respectively, from the lower end of the down frame 31, and a rear frame 34 extended obliquely rearward and upward from the rear ends of the right side member 33 and the left side member 32.

Figure 2:
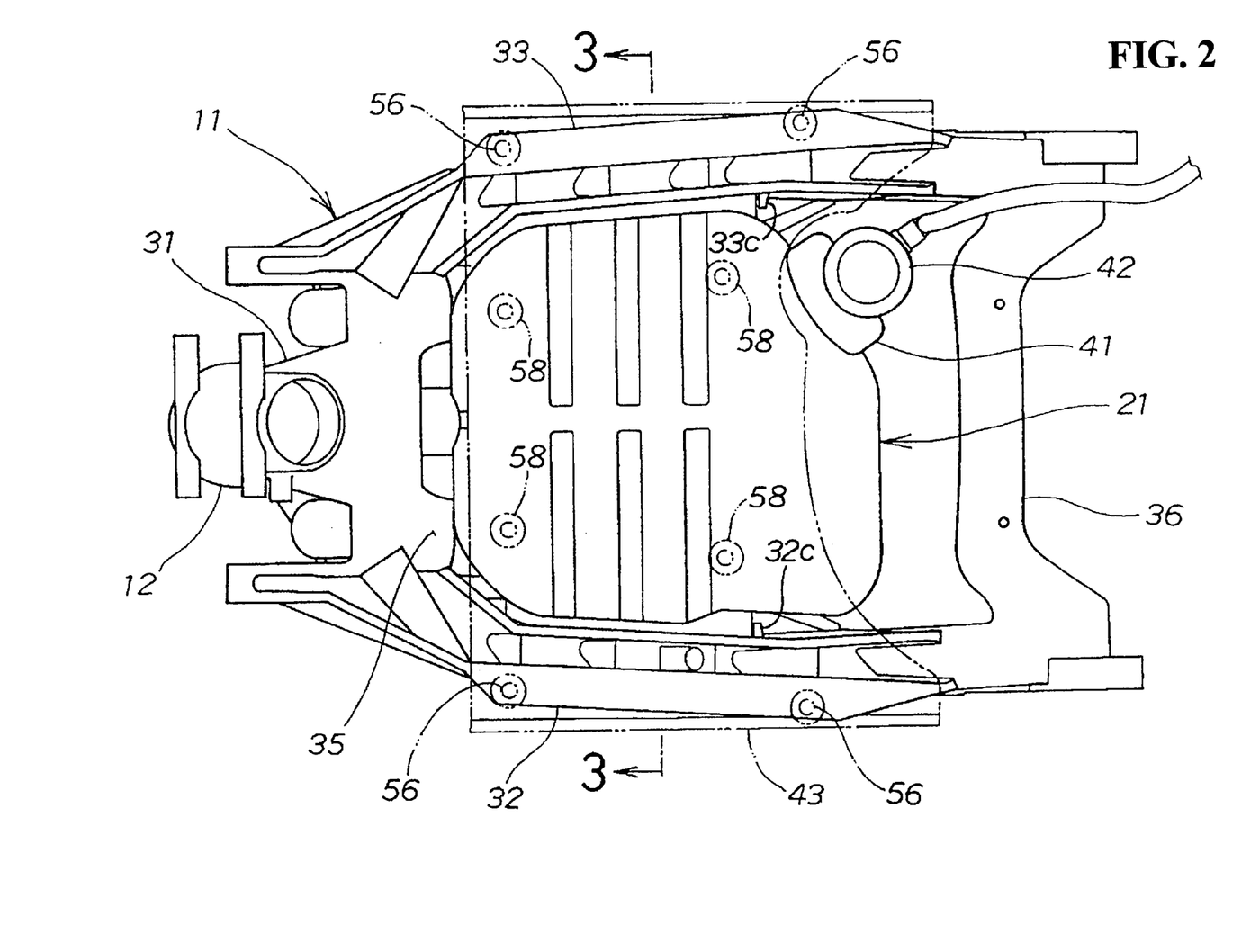
FIG. 2 is a plan view of an essential part of the scooter related with the present invention.

FIG. 2 is a plan view of the scooter related with the present invention, i.e., a central part of the body frame 11.

The body frame 11 is formed by connecting the down frame 31 to the right side member 33 and the left side member 32 by a front cross member 35, and connecting the respective rear ends of the right side member 33 and the left side member 32 by a rear cross member 36.

The fuel tank 21 is formed by blow-molding a resin parison and has a rectangular shape in a plan view. The fuel tank 21 is disposed in a space surrounded by the front cross member 35, the right side member 33, the left side member 32 and the rear cross member 36 of the body frame 11. Shown also in FIG. 2 are a filler pipe 41 connected to the fuel tank 21, a filler cap 42 attached to the filler pipe 42, and a footboard 43 indicated by imaginary lines for supporting driver's feed thereon.

Figure 3:
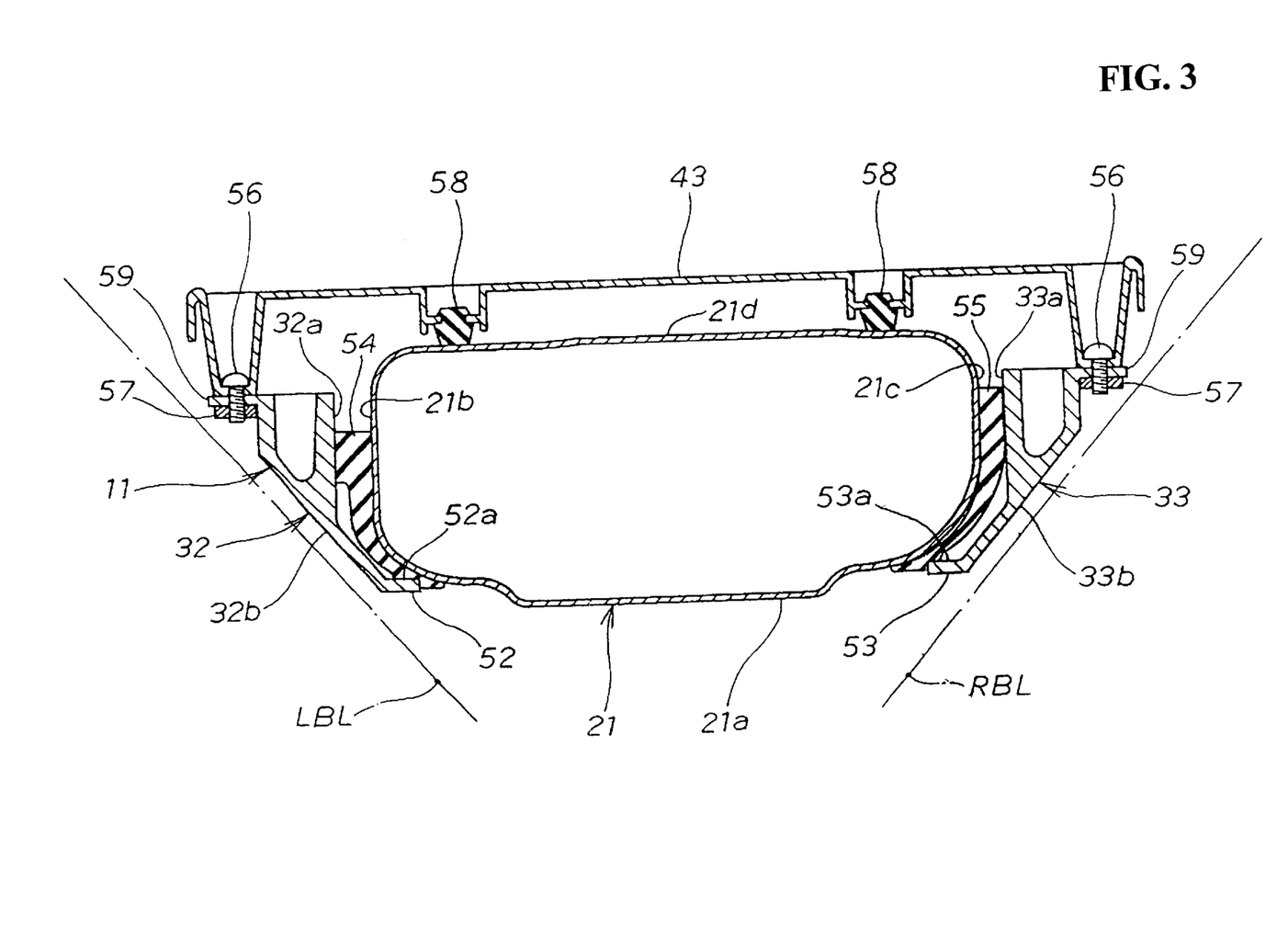
FIG. 3 is a sectional view taken on line 3—3 in FIG. 2.

FIG. 3 is a sectional view taken on line 3—3 in FIG. 2. The side members 32 and 33 have a U-shaped cross section and open upward as shown in FIG. 3. A left fuel tank shelf 52 and a right fuel tank shelf 53 are extended obliquely toward the center of the body from the lower ends of the right side member 33 and the left side member 32, respectively. A left cushion sheet 54 and a right cushion sheet 55, i.e., elastic members of rubber, is placed on the left fuel tank shelf 52 and the right fuel tank shelf 53, respectively, and the fuel tank 21 is seated on the cushion sheets 54 and 55. Then, the footboard 43 is fastened to the left side member 32 and the right side member 33 with screws 56 and nuts 57 so as to press the fuel tank 21 against the fuel tank shelves 54 and 55 through rubber cushion members 58. Indicated at 59 are flanges formed integrally with the left side member 32 and the right side member 33 to hold the footboard 43.

Chain lines are left bank line LBL and a right bank line RBL. The left bank line LBL indicates the position of the ground relative to the body frame 11 when the scooter 10 (FIG. 1) is turned to the left, and the right bank line RBL indicates the position of the ground relative to the body frame 11 when the scooter 10 is turned to the right.

The left side member 32 and the right side member 33 have inclined outer surfaces 32b and 33b parallel to the left bank line LBL and the right bank line RBL, respectively. Therefore, the left side member 32 and the right side member 33 can be spaced a large distance apart to secure a large space for the fuel tank 21. Furthermore, the fuel tank 21 may be of a large capacity and hence the scooter 10 is able to travel a long distance without refueling when the fuel tank 21 is filled fully with fuel.

Since upper parts of the left side member 32 and the right side member 33 can be extended greatly outward and the distance between the outer edges of the flanges 59 can be increased, the footboard 43 may be of a great width. Thus, the footboard 43 provides a sufficiently large space for the driver's feet and hence the driver is able to enjoy a comfortable ride.

The left cushion sheet 54 has an inner surface of a shape conforming to the shape of a portion of the fuel tank 21 between the left end of the lower surface 21a of the fuel tank 21 and the left side surface 21b of the same, and an outer surface of a shape conforming to the shape of the inner surface 32a of the left side member 32 and the upper surface 52a of the left fuel tank shelf 52.

The right cushion sheet 55 has an inner surface of a shape conforming to the shape of a portion of the fuel tank 21 between the right end of the lower surface 21a of the fuel tank 21 and the right side surface 21c of the same, and an outer surface of a shape conforming to the shape of the inner surface 33a of the right side member 33 and the upper surface 53a of the right fuel tank shelf 53.

The fuel tank 21 is located and held in place with respect to directions along the longitudinal axis of the scooter by the front cross member 35 of the body frame 11, in contact with the front end of the fuel tank 21 and a locating plate, not shown, extended forward from the rear cross member 36 so as to be in contact with the rear end of the fuel tank 21 or by friction between the fuel tank 21 and the cushion sheets 54 and 55 and friction between the side members 32 and 33 and the cushion sheets 54 and 55. The cushion sheets 54 and 55 may be positioned relative to the side members 32 and 33 by cushion sheet positioning ribs 32c and 33c formed as shown in FIG. 2 in the side members 32 and 33 so as to protrude inward from the inner surfaces of the side members 32 and 33, respectively.

Figure 4:
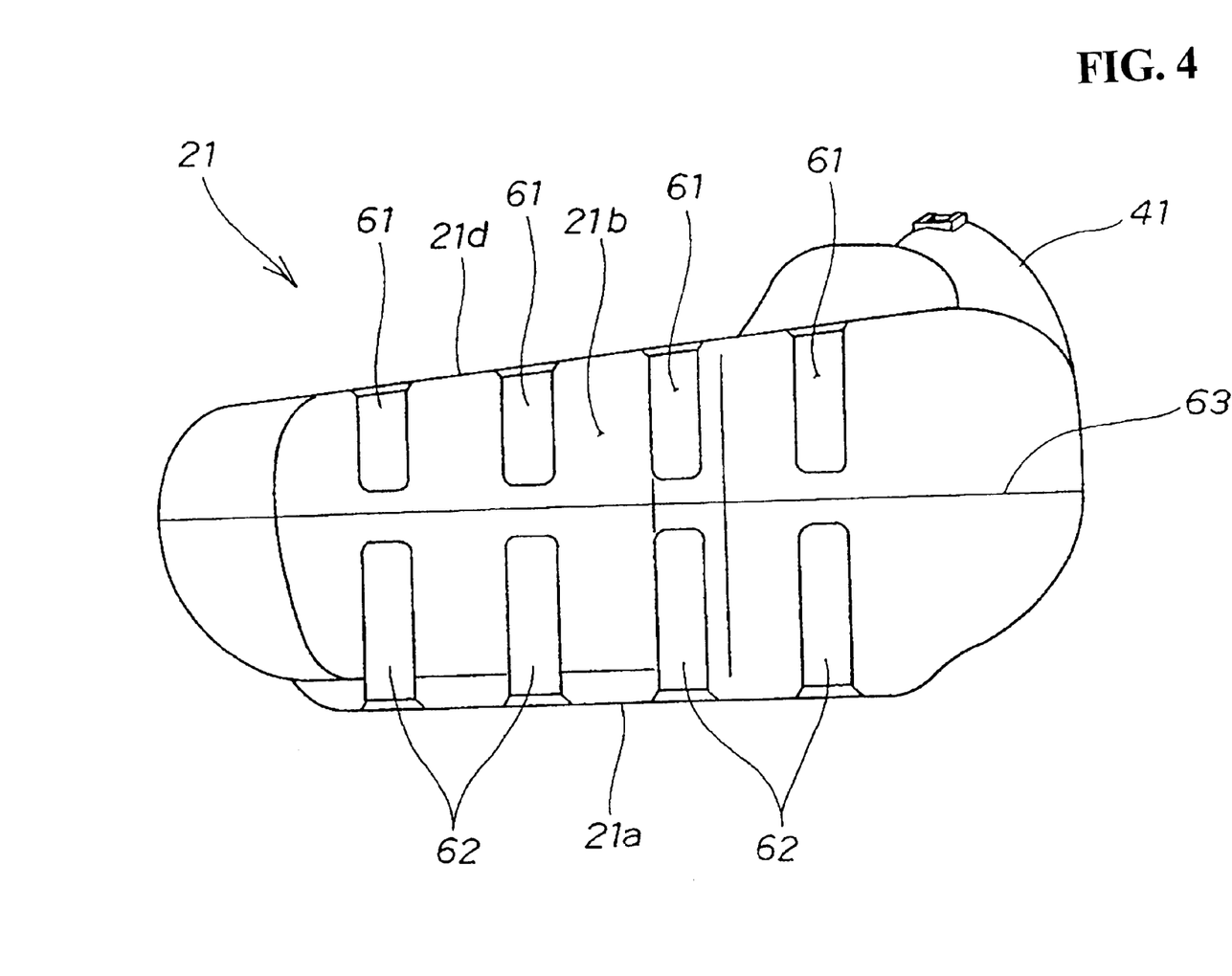
FIG. 4 is a side elevation of a fuel tank relating to the present invention.

FIG. 4 is a side elevation of the fuel tank relating to the present invention. The fuel tank 21 is provided with concave ribs 61 formed so as to extend between the side walls 21b and 21c (the side wall 21c is not shown) and the upper surface 21d of the fuel tank 21, and concave ribs 62 formed so as to extend between the side walls 21b and 21c and the lower surface 21a of the fuel tank 21.

The concave ribs 61 and 62 enhance the rigidity of the fuel tank 21. When the cushion sheets 54 and 55 are provided with ribs capable of engaging in the concave ribs 61 and 62 on their inner surfaces, force for restraining the fuel tank 21 from longitudinal movement can be increased.

In FIG. 4, indicated at 63 is a parting line formed in the surface of the fuel tank 21 by the parting line of a blow-molding die when forming the fuel tank 21 by blow-molding.

Since the fuel tank 21 relating with the present invention does not have any flange, the position of the parting line 63 can be optionally determined, which increases the degree of freedom of designing the shape of the fuel tank 21. Therefore, the fuel tank 21 can be formed in a shape conforming to the shapes of the body frame 11 and the footboard 43 in the largest possible capacity.

A fuel tank mounting procedure for mounting the fuel tank 21 on the body frame 11 will be described.

Figure 5A:
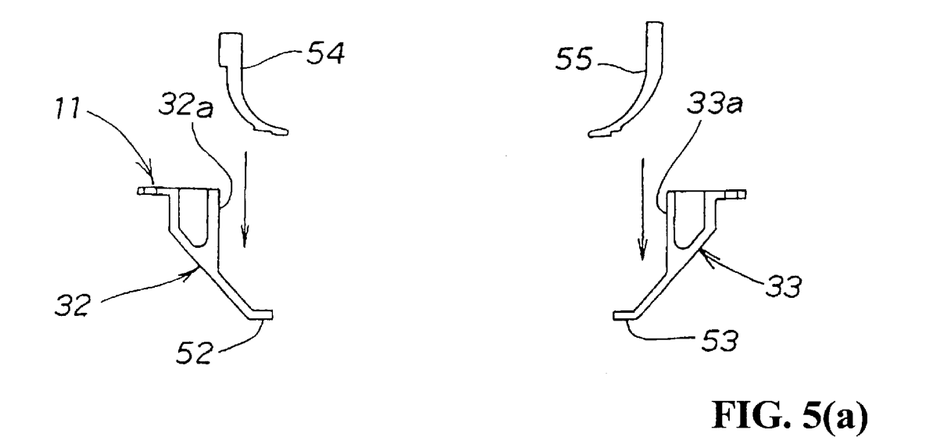
FIGS. 5(a), 5(b) and 5(c) is a schematic sectional view of assistance in explaining a fuel tank mounting procedure.
Figure 5B:
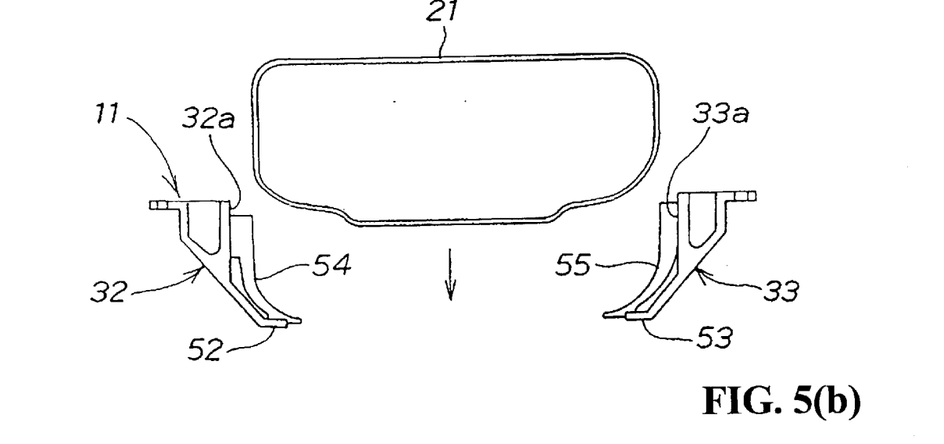
Figure 5C:
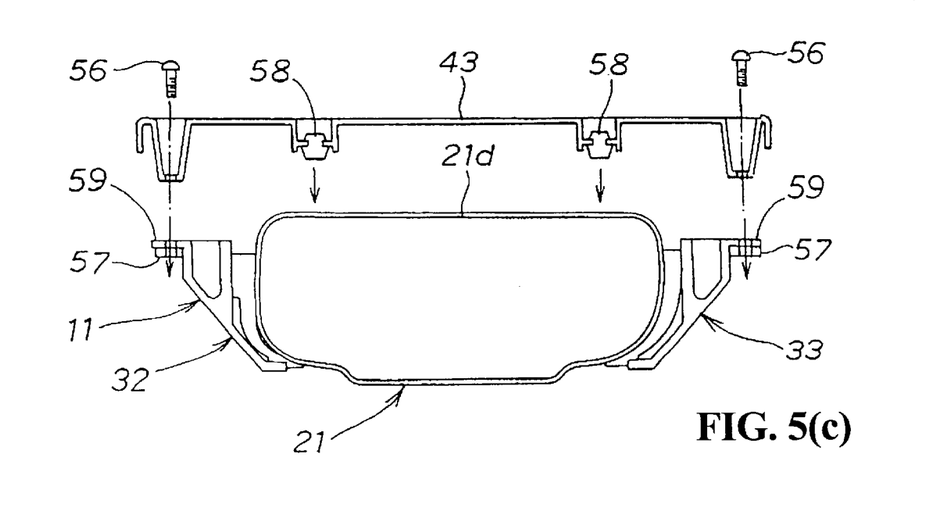

FIGS. 5(a) to 5(c) is views of assistance in explaining the fuel tank mounting procedure.

In a step shown in FIG. 5(a), the cushion sheets 54 and 55 are placed on the fuel tank shelves 52 and 53 of the side members 32 and 33 of the body frame 11 so as to extend along the inner surfaces 32a and 33a of the side members 32 and 33, respectively The cushion sheets 54 and 55 may be bonded with an adhesive to at least either the fuel tank shelves 52 and 53 or the inner surfaces 32a and 33a of the side members 32 and 33, respectively.

In a step shown in FIG. 5(b), the fuel tank 21 is seated on the cushion sheets 54 and 55.

In a step shown in FIG. 5(c), the footboard 43 is fastened to the flanges 59 of the side members 32 and 33 with the screws 56 and the nuts 57, so that the rubber cushion members 58 are pressed against the upper surface 21d of the fuel tank 21. Threaded holes may be formed in the flanges 59 of the side members 32 and 33 to screw the screws 56 therein and the nuts 57 may be omitted.

As apparent from the description made in connection with FIGS. 1 and 3, according to the present invention, the fuel tank mounting structure for the scooter 10 having the down frame 31 extended downward from the head pipe 12, the pair of side members 32 and 33 extended backward from the down frame 31, the footboard 43 attached to the pair of support members 32 and 33, and the fuel tank 21 disposed under the footboard 43, comprises the fuel tank shelves 52 and 53 extended from the lower parts of the side members 32 and 33 toward the center of the body of the scooter 10, wherein the fuel tank 21 is seated on the cushion sheets 54 and 55 placed on the fuel tank shelves 52 and 53, and is held in place by the footboard 43.

Since the fuel tank 21 is seated on the cushion sheets 54 and 55 placed on the fuel tank shelves 52 and 53 extended from the side members 32 and 33 and is held in place by the footboard 43, the degree of freedom of design of the fuel tank 21 is greater than that of the conventional fuel tank provided with a flange to be fastened to the footboard support frames with screws, the fuel tank 21 does not need any flange, and the procedure for mounting the fuel tank 21 on the body frame 11 does not need any fastening step for fastening the fuel tank 21 with screws to the body frame 11.

Thus, the fuel tank 21 can be manufactured at a low cost and can be easily mounted on the body frame 11.

Although the foregoing embodiment uses the cushion sheets 54 and 55 and the rubber cushion members 58 shown in FIG. 3 for holding the fuel tank 21 in place, a right cushion sheet extending from the lower surface 21a through the right side surface 21c to the upper surface 21d, and a left cushion sheet extending from the lower surface 21a through the left side surface 21b to the upper surface 21d may be used for holding the fuel tank 21 by the footboard 43.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel tank mounting structure for a scooter comprising:
    a front frame extending downward from a head pipe;
    a left and right footboard support frame extending backward from the front frame;
    a footboard attached to said left and right footboard support frame;
    a fuel tank disposed under said footboard, and
    fuel tank shelves extending from lower parts of said footboard support frames toward a center of a body of the scooter, wherein said fuel tank is seated on cushion sheets placed on said fuel tank shelves, and is held in place by the footboard.

2. The fuel tank mounting structure according to claim 1, further comprising a flange member formed integrally on said left and right footboard support frame.

3. The fuel tank mounting structure according to claim 2, wherein said flange member is attached to said footboard.

4. The fuel tank mounting structure according to claim 3, wherein said flange member is fastened to said footboard by screws and nuts.

5. The fuel tank mounting structure according to claim 1, wherein said cushion sheets are composed from an elastic member.

6. The fuel tank mounting structure according to claim 5, wherein said cushion sheets are composed from rubber.

7. The fuel tank mounting structure according to claim 1, wherein said cushion sheets are bonded with an adhesive to said fuel tank shelves.

8. The fuel tank mounting structure according to claim 1, wherein said cushion sheets are bonded with adhesive to an inner surface of said footboard support frame.

9. The fuel tank mounting structure according to claim 1, wherein said fuel tank is formed by blow-molding.

10. The fuel tank mounting structure according to claim 1, further comprising rubber cushion members pressed against the upper surface of the fuel tank.

11. A fuel tank mounting structure for a scooter comprising:
    a front frame extending downward from a head pipe;
    a left and right footboard support frame extending backward from the front frame, each said left and right footboard support frame having a U-shaped cross section which opens upwardly;
    a footboard attached to said left and right footboard support frame;
    a fuel tank disposed under said footboard; and
    fuel tank shelves extending from lower parts of said footboard support frames toward a center of a body of the scooter, wherein said fuel tank is seated on cushion sheets placed on said fuel tank shelves, and is held in place by the footboard.

12. A fuel tank mounting structure for a scooter comprising:
    a front frame extending downward from a head pipe;
    a left and right footboard support frame extending backward from the front frame;
    a footboard attached to said left and right footboard support frame;
    a fuel tank disposed under said footboard; and
    fuel tank shelves extending from lower parts of said footboard support frames toward a center of a body of the scooter, said fuel tank is seated on cushion sheets placed on said fuel tank shelves, wherein said cushion sheets may be positioned relative to the footboard support frames by cushion sheet positioning ribs formed in the footboard support frames so as to protrude inward from inner surfaces of the footboard support frames.

13. A fuel tank mounting structure for a scooter comprising:
    a front frame extending downward from a head pipe;
    a left and right footboard support frame extending backward from the front frame, each said left and right footboard support frame having a U-shaped cross section which opens upwardly;
    a footboard attached to said left and right footboard support frame;
    a fuel tank disposed under said footboard, said fuel tank being provided with concave ribs; and
    fuel tank shelves extending from lower parts of said footboard support frames toward a center of a body of the scooter, wherein said fuel tank is seated on cushion sheets placed on said fuel tank shelves, and is held in place by the footboard.

14. The fuel tank mounting structure according to claim 13, wherein said concave ribs of said fuel tank engages with said cushion sheet positioning ribs.

15. A fuel tank mounting structure for a scooter comprising:

a front frame extending downward from a head pipe;

a left and right footboard support frame extending backward from the front frame;

a footboard attached to said left and right footboard support frame;

a fuel tank disposed under said footboard, and fuel tank shelves extending from lower parts of said footboard support frames toward a center of a body of the scooter, wherein said fuel tank is seated on a left cushion sheet and a right cushion sheet placed on said fuel tank shelves, and is held in place by the footboard;

wherein said left cushion sheet includes an inner surface of a shape conforming to a shape of a portion of said fuel tank between the left end of a lower surface of said fuel tank and a left side surface; and also includes an outer surface of a shape conforming to a shape of said inner surface of said left footboard support frame and an upper surface of a left fuel tank shelf.

16. A fuel tank mounting structure for a scooter comprising:

a front frame extending downward from a head pipe;

a left and right footboard support frame extending backward from the front frame;

a footboard attached to said left and right footboard support frame;

a fuel tank disposed under said footboard, and fuel tank shelves extending from lower parts of said footboard support frames toward a center of a body of the scooter, wherein said fuel tank is seated on a left cushion sheet and a right cushion sheet placed on said fuel tank shelves, and is held in place by the footboard;

wherein said right cushion sheet includes an inner surface of a shape conforming to a shape of a portion of said fuel tank between the right end of a lower surface of said fuel tank and a right side surface; and also includes an outer surface of a shape conforming to a shape of said inner surface of said right footboard support frame and an upper surface of a right fuel tank shelf.

17. A fuel tank mounting structure for a scooter comprising:

a front frame extending downward from a head pipe;

a left and right footboard support frame extending backward from the front frame, including inclined outer surfaces which are parallel to a left bank line and a right bank line, respectively;

a footboard attached to said left and right footboard support frame;

a fuel tank disposed under said footboard, and fuel tank shelves extending from lower parts of said footboard support frames toward a center of a body of the scooter, wherein said fuel tank is seated on cushion sheets placed on said fuel tank shelves, and is held in place by the footboard.

* * * * *